United States Patent
Huang et al.

(10) Patent No.: US 7,529,064 B1
(45) Date of Patent: May 5, 2009

(54) DISK DRIVE INCLUDING A BALANCING ELEMENT WITH FIRST AND SECOND CAVITIES AND A CYLINDRICAL PORTION DISPOSED ABOUT A SPINDLE MOTOR HUB

(75) Inventors: Yao-Hsin Huang, San Jose, CA (US); Neyram Hemati, Saratoga, CA (US); Charles D. Flanigan, San Jose, CA (US); Chunjer Chuck Cheng, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 268 days.

(21) Appl. No.: 11/285,427

(22) Filed: Nov. 21, 2005

(51) Int. Cl.
*G11B 17/02* (2006.01)
(52) U.S. Cl. .................................. 360/99.08
(58) Field of Classification Search ........................ None
See application file for complete search history.

(56) References Cited

U.S. PATENT DOCUMENTS

| | | | |
|---|---|---|---|
| 4,561,035 A | 12/1985 | McDorman et al. | |
| 4,864,443 A * | 9/1989 | Peterson | 360/99.12 |
| 5,130,870 A | 7/1992 | Jabbari | |
| 5,422,776 A | 6/1995 | Thorson et al. | |
| 5,517,376 A | 5/1996 | Green | |
| 5,555,144 A | 9/1996 | Wood et al. | |
| 5,621,588 A | 4/1997 | Williams et al. | |
| 5,790,345 A | 8/1998 | Alt | |
| 5,877,571 A | 3/1999 | Brooks | |
| 6,158,112 A | 12/2000 | Kim et al. | |
| 6,178,063 B1 * | 1/2001 | Wood et al. | 360/98.08 |
| 6,288,867 B1 | 9/2001 | Jierapipatanakul et al. | |
| 6,430,002 B1 | 8/2002 | Voights | |
| 6,484,575 B2 | 11/2002 | Horning et al. | |
| 6,504,674 B2 | 1/2003 | Yoshida et al. | |
| 6,507,555 B1 | 1/2003 | Masaki et al. | |
| 6,542,330 B1 | 4/2003 | Choo et al. | |
| 6,550,328 B1 | 4/2003 | Horning et al. | |
| 6,563,668 B1 * | 5/2003 | Suwito | 360/98.08 |
| 6,594,109 B2 | 7/2003 | Renken | |
| 6,608,733 B2 | 8/2003 | Elsing | |
| 6,624,967 B1 * | 9/2003 | Suwito | 360/98.08 |
| 6,754,042 B1 | 6/2004 | Chiou et al. | |
| 6,678,114 B2 | 10/2004 | Jierapipatanakul et al. | |
| 6,816,338 B1 * | 11/2004 | Suwito | 360/99.12 |
| 7,239,476 B2 * | 7/2007 | Chan et al. | 360/98.08 |
| 7,307,813 B1 * | 12/2007 | Suwito | 360/98.08 |
| 2003/0112552 A1 | 6/2003 | Choo et al. | |
| 2005/0078409 A1 | 4/2005 | Elsing | |

\* cited by examiner

Primary Examiner—David D Davis
(74) *Attorney, Agent, or Firm*—Barcelo & Harrison LLP

(57) ABSTRACT

A disk drive includes a base, and a spindle motor coupled to the base. The spindle motor includes a hub defining an axis of rotation. The disk drive further includes a disk disposed about the hub and including a disk inner diameter biased against the hub at a contact location of the hub. The disk drive further includes a balancing element including a cylindrical portion disposed about the hub. The balancing element further includes a first cavity defining a first cavity centroid disposed on a same side of the axis of rotation as the contact location, and a second cavity defining a second cavity centroid disposed on a side of the axis of rotation opposite the first cavity centroid. The second cavity centroid is spaced apart from the first cavity centroid in a direction along the axis of rotation.

19 Claims, 16 Drawing Sheets

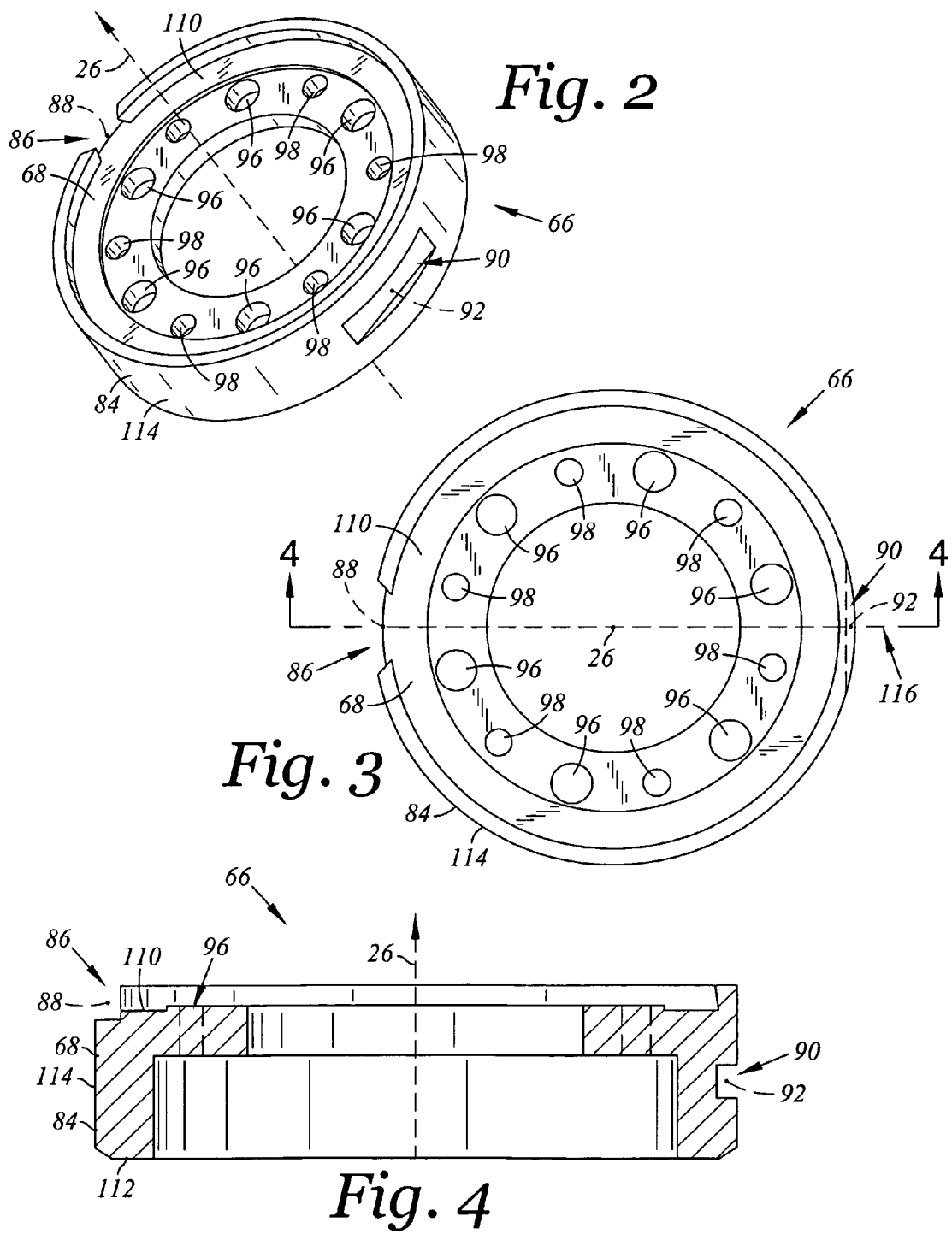

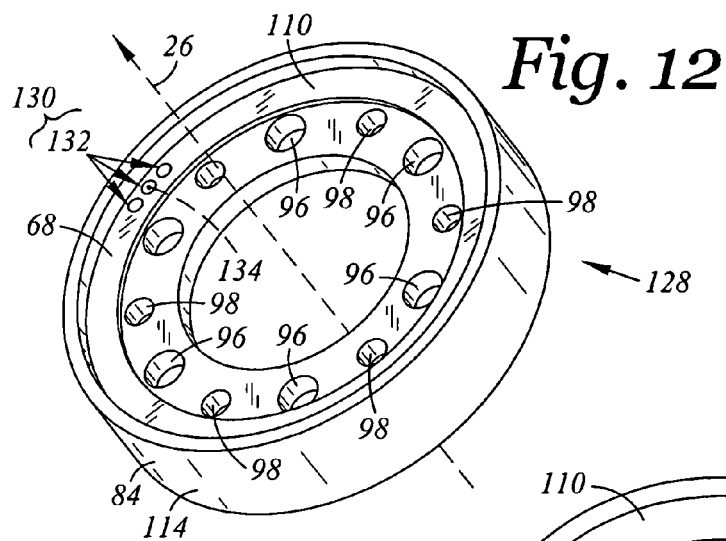
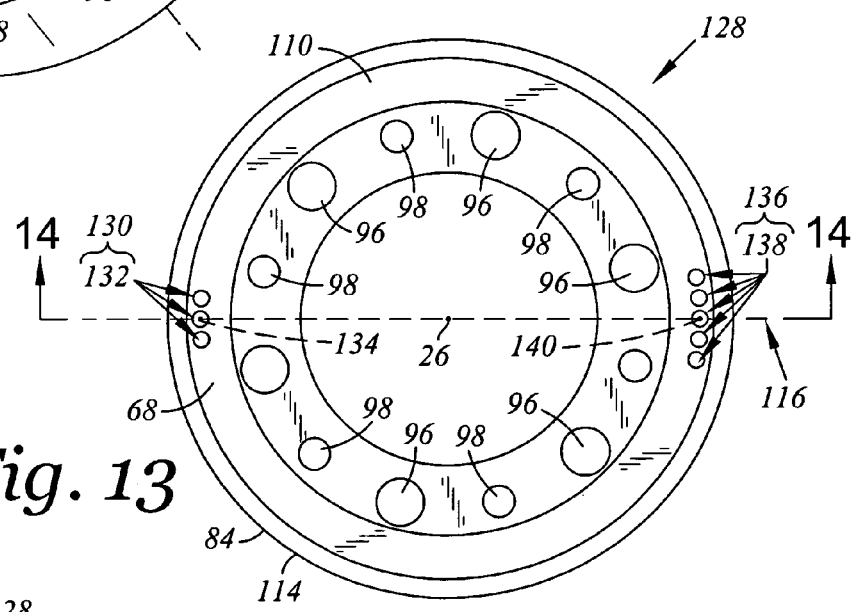
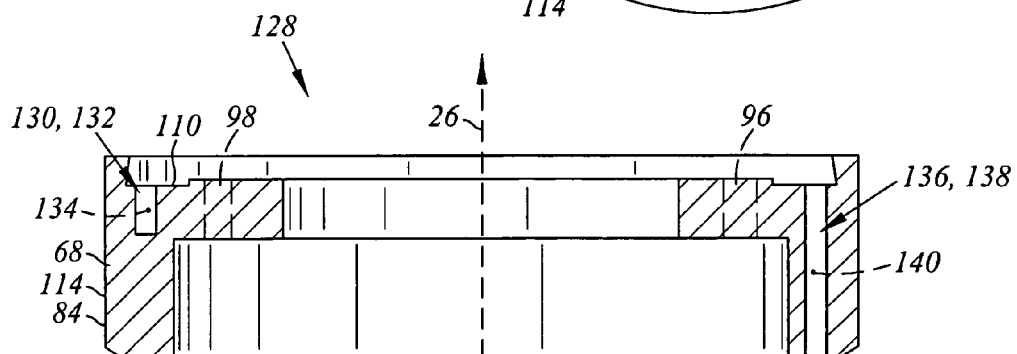

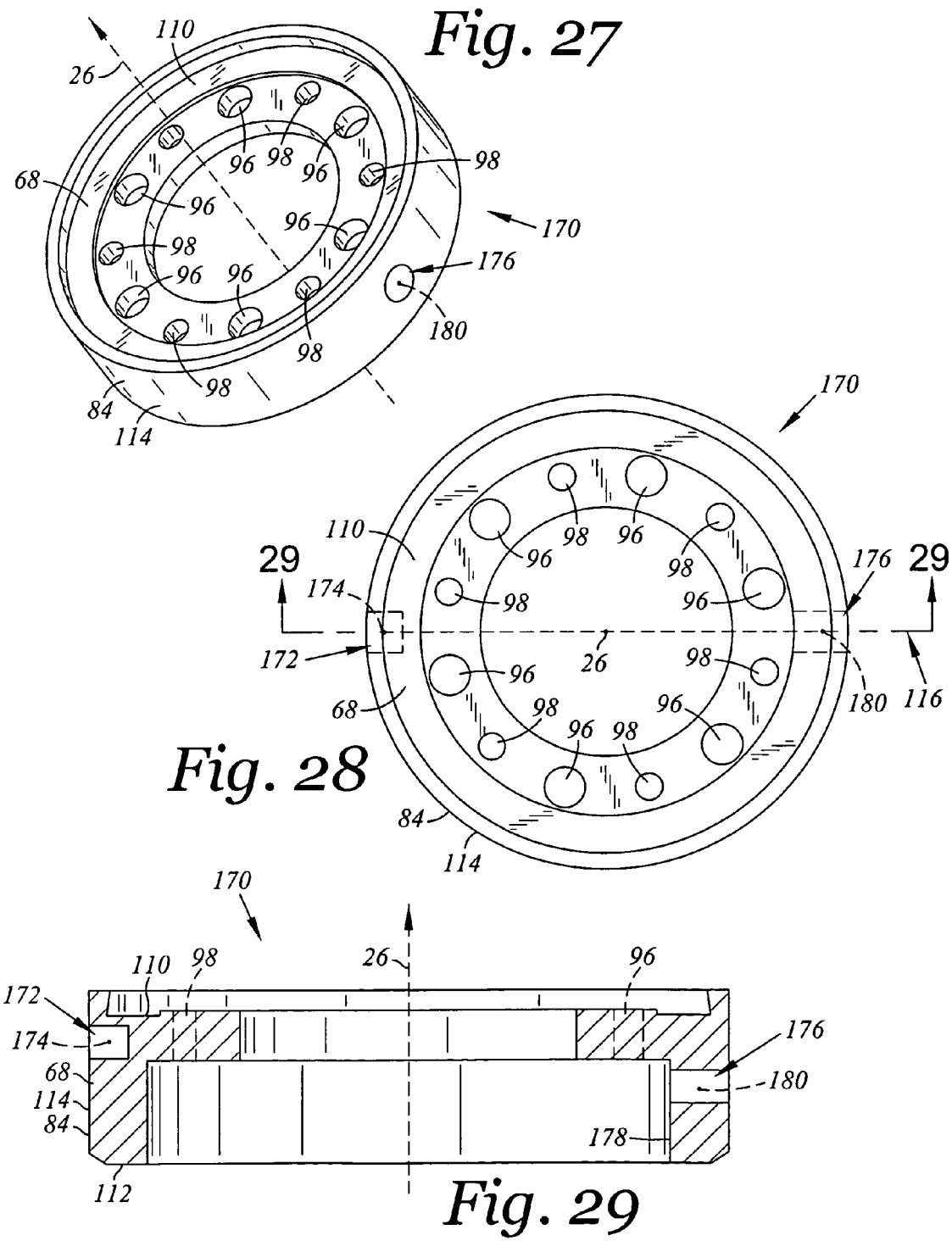

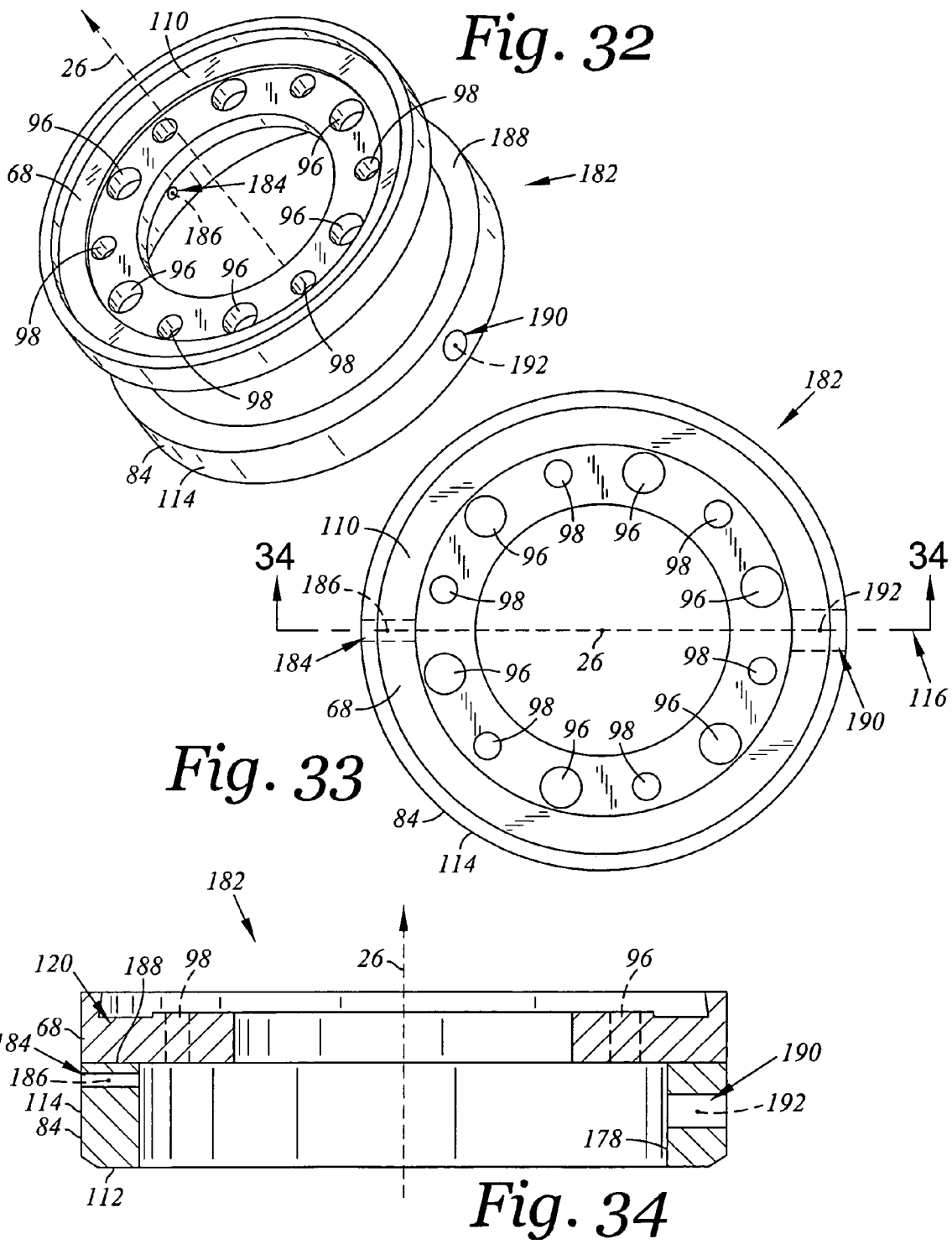

DISK DRIVE INCLUDING A BALANCING ELEMENT WITH FIRST AND SECOND CAVITIES AND A CYLINDRICAL PORTION DISPOSED ABOUT A SPINDLE MOTOR HUB

FIELD OF THE INVENTION

The present invention relates generally to disk drives, and in particular to a disk drive including a balancing element with first and second cavities and a cylindrical portion disposed about a spindle motor hub.

BACKGROUND

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a pivot bearing cartridge to facilitate rotational movement of the actuator assembly. An actuator coil is supported by the actuator body and is configured to interact with one or more magnets, typically a pair, to form a voice coil motor. One or more actuator arms extend from an opposite side of the actuator body.

The spindle motor typically includes a spindle motor base, a spindle motor shaft, a rotatable spindle motor hub, a stator disposed at the disk drive base, a magnet attached to the spindle motor hub, and a bearing cartridge disposed between the spindle motor shaft and the spindle motor hub to facilitate rotational attachment of the spindle motor hub to the spindle motor base. The spindle motor hub may support one or more of the disks that may be separated by disk spacers. A disk clamp may be used to secure the disks to the spindle motor hub. The various rotating elements associated with the disks may be referred to as a disk pack.

The stator typically includes a series of coils that are in electrical communication with the printed circuit board assembly. With this general configuration, the various coils of the stator are selectively energized to form an electromagnetic field that pulls/pushes on the magnet, thereby imparting a rotational motion onto the spindle motor hub. Rotation of the spindle motor hub results in the rotation of the overall disk pack including the attached disks.

A topic of concern is rotational balancing of the spindle motor and the overall disk pack. It is important that the mass of the disk pack be balanced so as to reduce dynamic vibrations during operation of the disk drive. Excessive imbalance can degrade the disk drive performance not only in terms of read/write errors, but also in terms of seek times. Excessive imbalance may result in an undesirable acoustic signature and may even result in damage or excessive wear to various disk drive components.

The disk inner surface of each disk is slightly larger in diameter than an outer periphery of the spindle motor hub in order to allow the disks to slip about the spindle motor hub during installation. It is contemplated that the disks may be positioned in an inexact concentric manner about the spindle motor hub. In fact, the disks may be intentionally biased against the spindle motor hub. This results in the disk pack becoming imbalanced in two respects. First, the rotating mass of each biased disk results in a centrifugal force radially extending in a direction from the axis of rotation in a plane orthogonal to the axis of rotation that includes the axis of rotation. This is sometimes referred to as a single plane or "static" imbalance. Second, the same centrifugal force also results in a moment about an axis extending from the axis of rotation in a plane orthogonal to the axis of rotation through the axis of rotation. This is sometimes referred to as a two plane or "dynamic" imbalance.

Accordingly, there is a need in the art for an improved configuration for balancing of the spindle motor and/or the overall disk pack.

SUMMARY

A disk drive includes a disk drive base, and a spindle motor rotatably coupled to the disk drive base. The spindle motor including a spindle motor hub defining an axis of rotation. The disk drive further includes a disk disposed about the spindle motor hub. The disk includes a disk inner diameter biased against the spindle motor hub at a contact location of the spindle motor hub. The disk drive further includes a balancing element. The balancing element includes a cylindrical portion disposed about the spindle motor hub. The balancing element further includes a first cavity defining a first cavity centroid disposed on a same side of the axis of rotation as the contact location, and a second cavity defining a second cavity centroid disposed on a side of the axis of rotation opposite the first cavity centroid. The second cavity centroid is spaced apart from the first cavity centroid in a direction along the axis of rotation.

According to various embodiments, the axis of rotation and the contact location define an alignment plane, the first cavity centroid and the second cavity centroid each are disposed within 20 degrees of the alignment plane about the axis of rotation. The second cavity centroid may be closer to the contact location along the axis of rotation than the first cavity centroid. The balancing element may include a surface disposed away from the disk and an outer periphery with respect to the axis of rotation. The first cavity may be disposed along the outer periphery at the upper surface. The first cavity may be open at the upper surface and the outer periphery. The second cavity may be open at the outer periphery. The balancing element may include a lower surface disposed towards the disk, and the second cavity may be open at the lower surface. Further, the second cavity may be closed at the outer periphery. The upper surface may be disposed away from the disk, and the second cavity may be a hole extending through the balancing element between the upper surface and the lower surface. The second cavity may define a uniform or a non-uniform diameter between the upper surface and the lower surface. The second cavity may be a contiguous cavity with the second cavity centroid within the second cavity. In another arrangement, the second cavity may be a split cavity that includes a plurality of voids. The plurality of voids may be symmetrically angularly spaced about the axis of rotation from the alignment plane. The second cavity centroid, considering all voids together, may be located outside of any one of the voids. The balancing element is a disk clamp. The cylindrical portion comprises an entirety of the balancing element. The balancing element may be a spacer ring. The disk drive may include a disk clamp. The spacer ring may be disposed adjacent a disk clamp and the disk may be the only disk of the disk drive.

BRIEF DESCRIPTION OF THE DRAWINGS

FIG. 2 is a perspective view of the balancing element of FIG. 1 in accordance with an embodiment of the present invention;

FIG. 3 is a top plan view of the balancing element of FIG. 2 (a second cavity indicated in dashed line);

FIG. 4 is a cross sectional side view of the balancing element of FIG. 3 as seen along axis 4-4;

FIG. 12 is a perspective view similar to that of FIG. 2, however, of a balancing element according to another embodiment;

FIG. 13 is a top plan view of the balancing element of FIG. 7;

FIG. 14 is a cross sectional side view of the balancing element of FIG. 13 as seen along axis 14-14;

FIG. 27 is a perspective view similar to that of FIG. 2, however, of a balancing element according to another embodiment;

FIG. 28 is a top plan view of the balancing element of FIG. 27 (first and second cavities indicated in dashed line);

FIG. 29 is a cross sectional side view of the balancing element of FIG. 28 as seen along axis 29-29;

FIG. 32 is an exploded perspective view similar to that of FIG. 2, however, of a balancing element according to another embodiment;

FIG. 33 is a top plan view of the balancing element of FIG. 32 (a second cavity indicated in dashed line);

FIG. 34 is a cross sectional side view of the balancing element of FIG. 33 as seen along axis 34-34;

DESCRIPTION OF THE PREFERRED EMBODIMENTS

Figure 1:
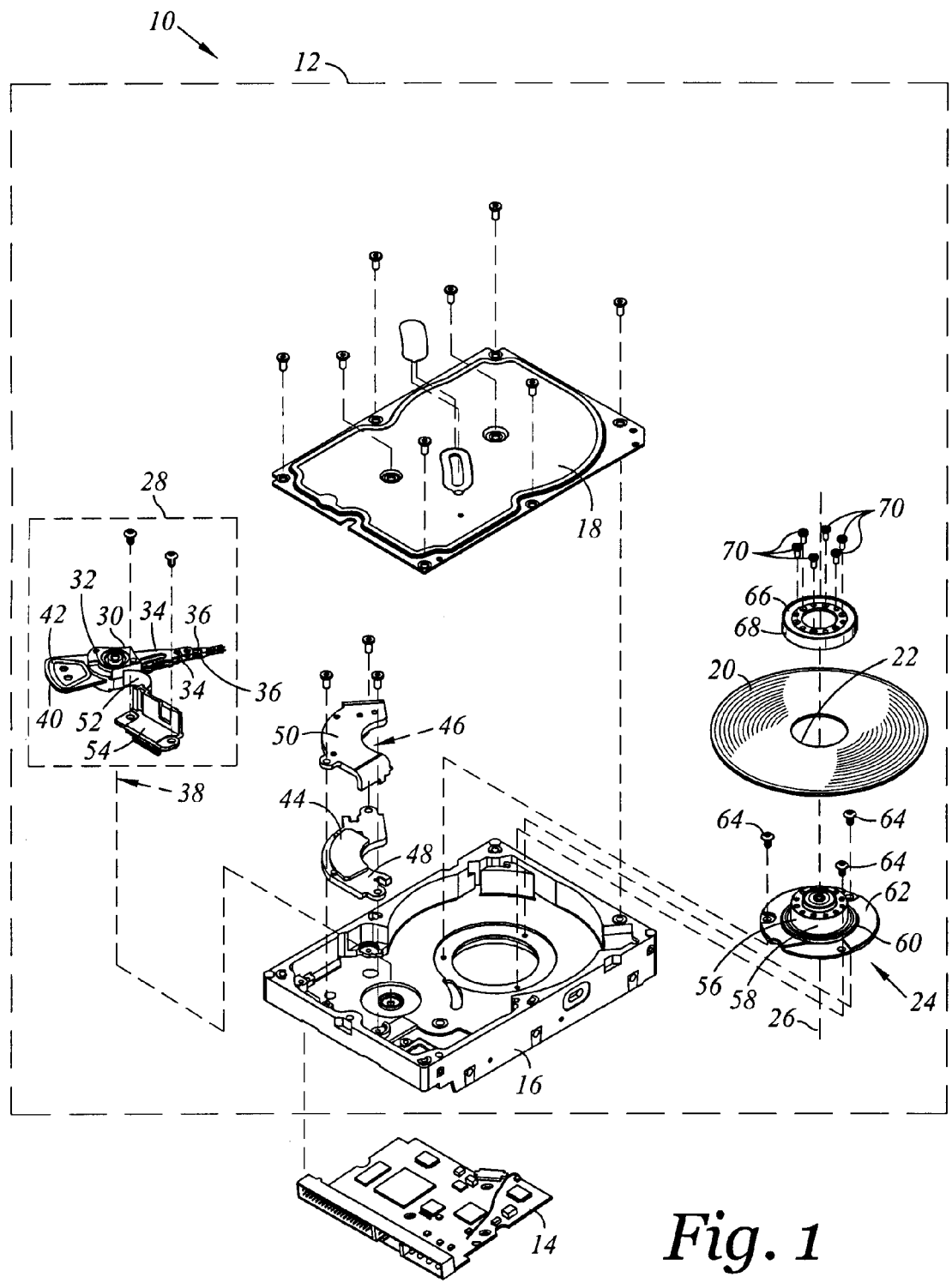
FIG. 1 is an exploded top perspective view of a disk drive with a balancing element.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. Though not shown, multiple disks 20 may be utilized. The disk 20 includes a disk inner diameter 22, and a plurality of tracks for storing data. The disk 20 may be of a magnetic recording type of storage device, however, other arrangements such as optical recording may be utilized. The head disk assembly 12 further includes a spindle motor 24 for rotating the disk 20 about a disk rotation axis 26. The head disk assembly 12 further includes a head stack assembly 28 rotatably attached to the disk drive base 16 in operable communication with the disk 20. The head stack assembly 28 includes a rotary actuator 30.

The rotary actuator 30 includes an actuator body 32 and actuator arms 34 that extend from the actuator body 32. Distally attached to the actuator arms 34 are suspension assemblies 36. The suspension assemblies 36 respectively support heads. In the case of magnetic recording, each of the heads includes a transducer that typically includes a writer and a read element. The suspension assemblies 36 with the heads are referred to as head gimbal assemblies. It is contemplated that the number of actuator arms and suspension assemblies may vary depending upon the number of disks and disk surfaces utilized.

Each head gimbal assembly includes a head that typically includes a transducer for writing and reading data and that is distally attached to each of the actuator arms. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 20. Each disk 20 includes opposing disk surfaces. In magnetic recording applications the disk surface typically includes one or more magnetic layers. Data may be recorded along data annular regions on a single disk surface or both. As such, the head stack assembly 28 may be pivoted such that each head is disposed adjacent to the various data annular regions from adjacent to the outer diameter to the inner diameter of each disk 20.

In the embodiment shown, the actuator body 32 includes a bore, and the rotary actuator 30 further includes a pivot bearing cartridge engaged within the bore for facilitating the actuator body 32 to rotate between limited positions about an axis of rotation 38. The actuator 30 further includes a coil support 40 that extends from one side of the actuator body 32 opposite the actuator arms 34. The coil support 40 is configured to support an actuator coil 42.

First and second of magnets 44, 46 are supported by magnet supports 48, 50 which are attached to the disk drive base 16. The actuator coil 42 interacts with the first and second magnets 44, 46 (the second magnet 46 is denoted in dashed lining and it is understood that it is disposed at an underside of the magnet support 50) to form a voice coil motor for controllably rotating the actuator 30. The head stack assembly 28 further includes a flex circuit assembly 52 and a cable connector 54. The cable connector 54 is attached to the disk drive base 16 and is disposed in electrical communication with the printed circuit board 14. The flex circuit assembly 52 supplies current to the actuator coil 42 and carries signals between the heads and the printed circuit board assembly 14.

The spindle motor 24 includes a spindle motor hub 56 that is rotatably attached to the disk drive base 16. The spindle motor hub 56 is configured to rotate about the axis of rotation 26. The spindle motor hub 56 includes a hub body 58 and a hub flange 60 that extends from the hub body 58. The hub flange 60 includes a supporting surface for supporting the disk 20. Though not shown in this embodiment, to the extent that multiple disks are desired, additional disks may be stacked and separated with annular disk spacers that are disposed about the hub body 58. In the embodiment shown, the spindle motor hub 56 is rotatably coupled to a spindle motor base 62 that is attached to the disk drive base 16 with a plurality of base fasteners 64.

As will be further discussed in detail below, the disk drive 10 includes a balancing element 66. An enlarged perspective view of the balancing element 66 is shown in FIG. 2, and a top plan view of the balancing element 66 is shown in FIG. 3. FIG. 4 depicts a cross sectional side view of the balancing element 66 of FIG. 3 as seen along axis 4-4. In this particular embodiment shown, the balancing element 66 takes the form of a disk clamp 68 which is attached about the spindle motor hub 56 and is utilized to apply a clamping force against the disk 20 for securing the disk 20 to the spindle motor hub 56. In this regard, a plurality of clamping fasteners 70 are disposed through the disk clamp 68 and engaged with the hub body 58.

Figure 5:
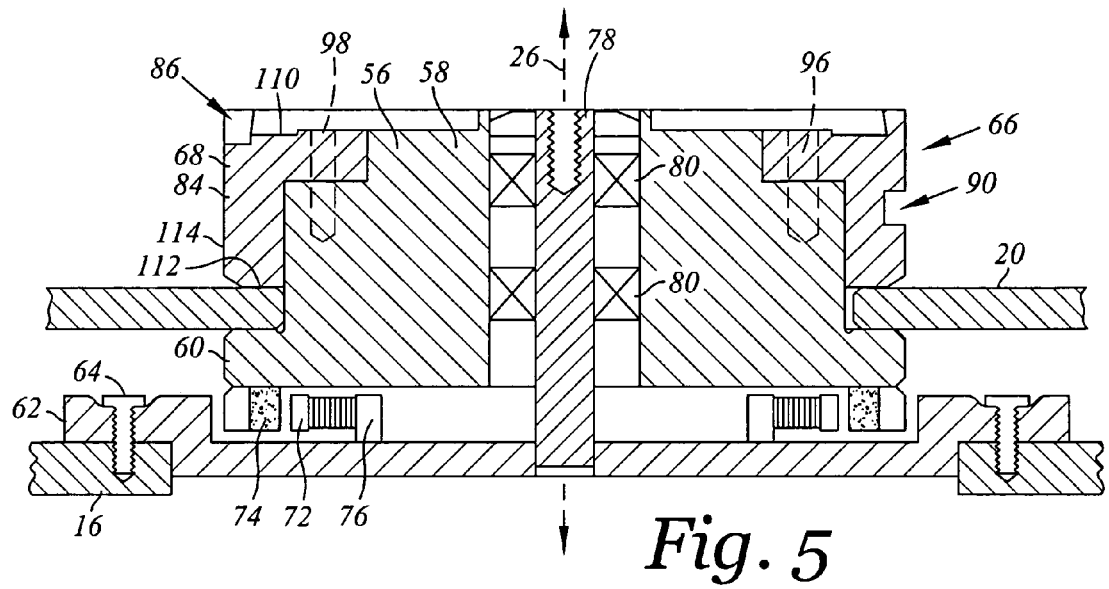
FIG. 5 is the cross sectional side view of the balancing element of FIG. 4 as shown with a spindle motor and a portion of a disk.

With further reference to the cross-sectional view of FIG. 5, the spindle motor 24 further includes a stator 72 attached to the disk drive base 16 and a magnet 74. In this embodiment the magnet 74 is attached to a bottom-facing portion of the spindle motor hub 56. However, other embodiments of the present invention employing other stator and/or magnet arrangements, such as an in-hub arrangement (e.g., with the magnet 74 positioned on an interior surfaced of an opening within the spindle motor hub 56 and the stator 72 protruding into such opening). The stator 72 includes a series of coils 76 that are in electrical communication with the printed circuit board assembly 14. The spindle motor hub 56 is rotatably mounted about a shaft 78 with a set of bearings 80. The shaft 78 is set in the spindle motor base 62. While the shaft 78 is fixed with respect to the disk drive base 16, it is contemplated that other bearing and shaft arrangements may be utilized such as a rotating shaft arrangement. The various coils 76 of the stator 72 are selectively energized to form an electromagnetic field that pulls/pushes on the magnet 74 thereby imparting a rotational motion onto the spindle motor hub 56 for rotating the disk 20. The various rotating members may be collectively referred to as a disk pack. In this regard, the disk pack may include the disk 20, the spindle motor hub 56, the magnet 74, the plurality of clamp fasteners 70, and the balancing element 66.

According to an embodiment as shown, there is provided the disk drive 10. The disk drive 10 includes the disk drive base 16, and the spindle motor 24 rotatably coupled to the disk drive base 16. The spindle motor 24 includes the spindle motor hub 56 defining the axis of rotation 26. The disk drive 10 further includes the disk 20 disposed about the spindle motor hub 24. The disk 20 includes the disk inner diameter 22 biased against the spindle motor hub 24 at a contact location 82 of the spindle motor hub 24. The disk drive 10 further includes the balancing element 66. The balancing element 66 includes a cylindrical portion 84 disposed about the spindle motor hub 24. The balancing element 66 further includes a first cavity 86 defining a first cavity centroid 88 disposed on a same side of the axis of rotation 26 as the contact location 82. The balancing element 66 further includes a second cavity 90 defining a second cavity centroid 92 disposed on a side of the axis of rotation 26 opposite the first cavity centroid 88. The second cavity centroid 92 is spaced apart from the first cavity centroid 88 in a direction along the axis of rotation 26.

Figure 6:
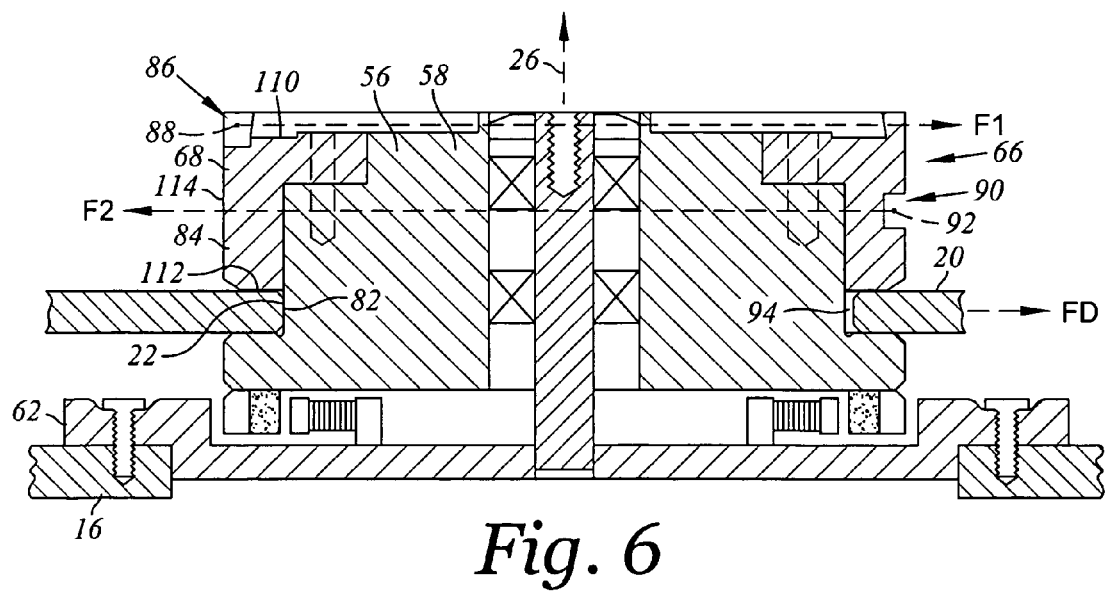
FIG. 6 is the cross sectional side view of the balancing element, the spindle motor and the portion of the disk of FIG. 5, however, as shown with the disk biased against the spindle motor and with symbolic force lines indicated.
Figure 7:
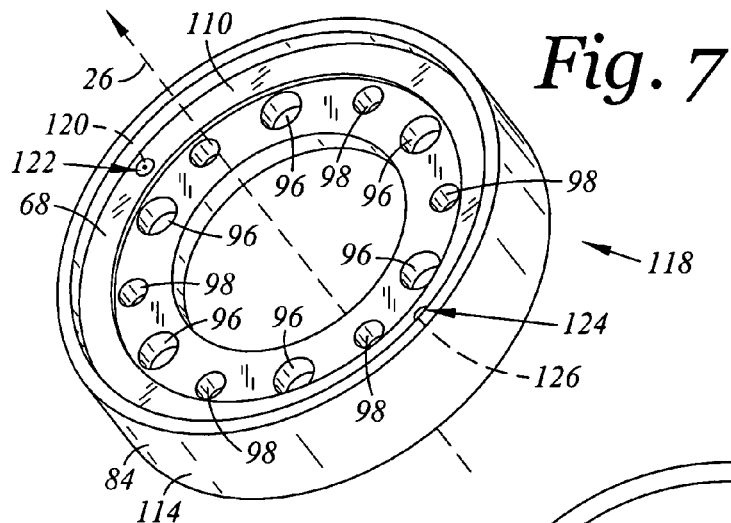
FIG. 7 is a perspective view similar to that of FIG. 2, however, of a balancing element according to another embodiment.
Figure 8:
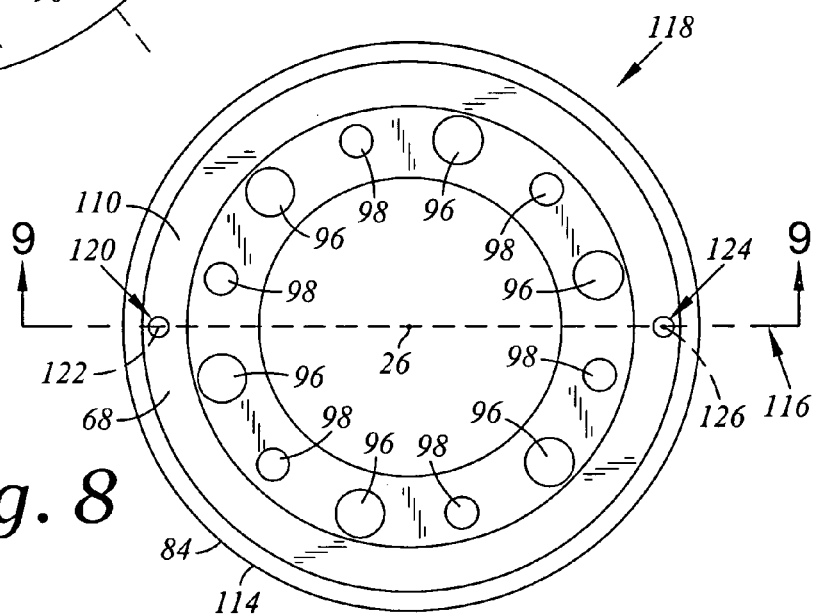
FIG. 8 is a top plan view of the balancing element of FIG. 7.
Figure 9:
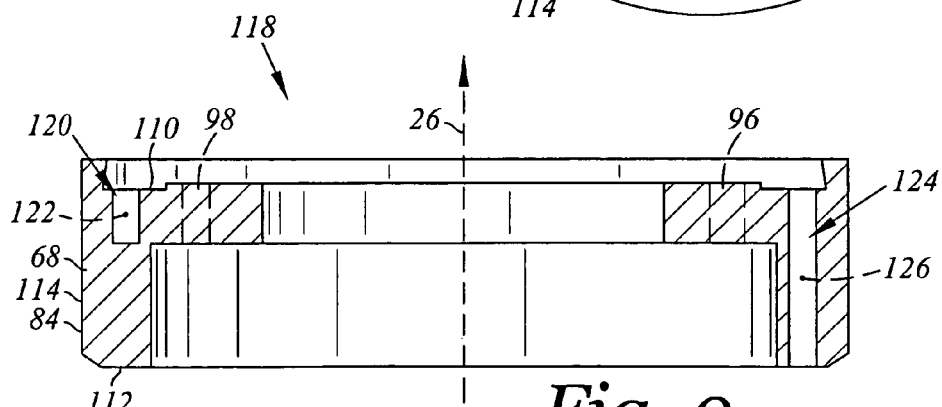
FIG. 9 is a cross sectional side view of the balancing element of FIG. 8 as seen along axis 9-9.
Figure 10:
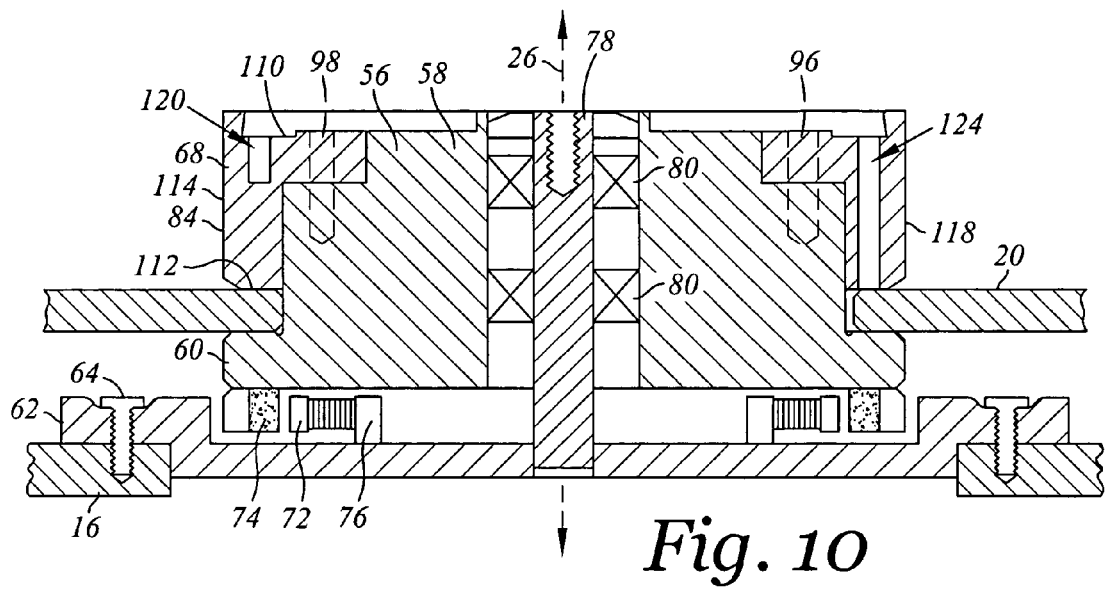
FIG. 10 is the cross sectional side view of the balancing element of FIG. 9 as shown with a spindle motor and a portion of a disk.
Figure 11:
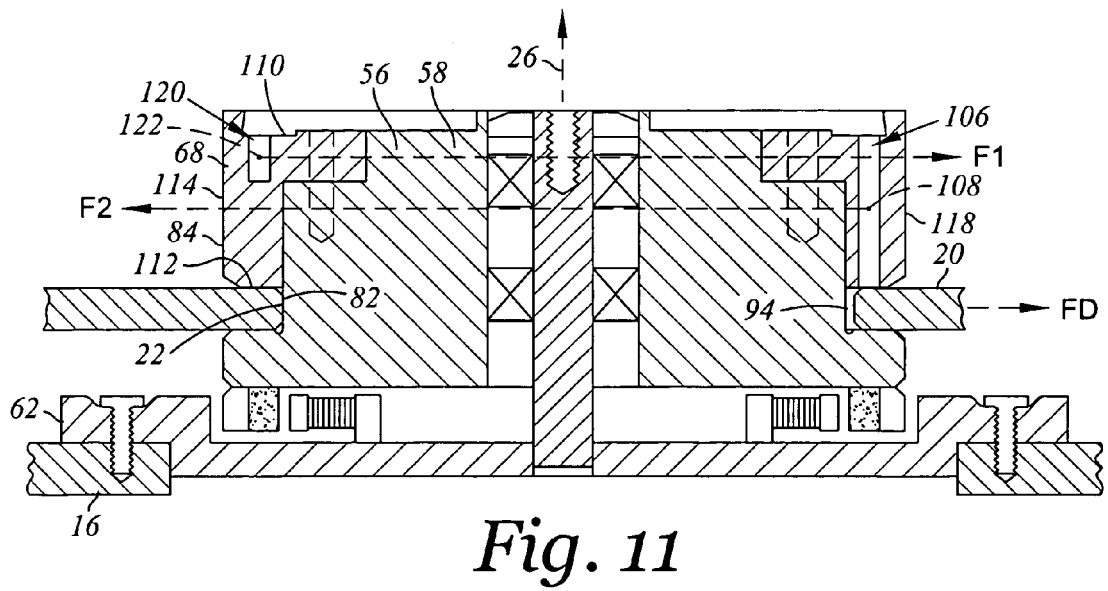
FIG. 11 is the cross sectional side view of the balancing element, the spindle motor and the portion of the disk of FIG. 10, however, as shown with the disk biased against the spindle motor and with symbolic force lines indicated.
Figure 15:
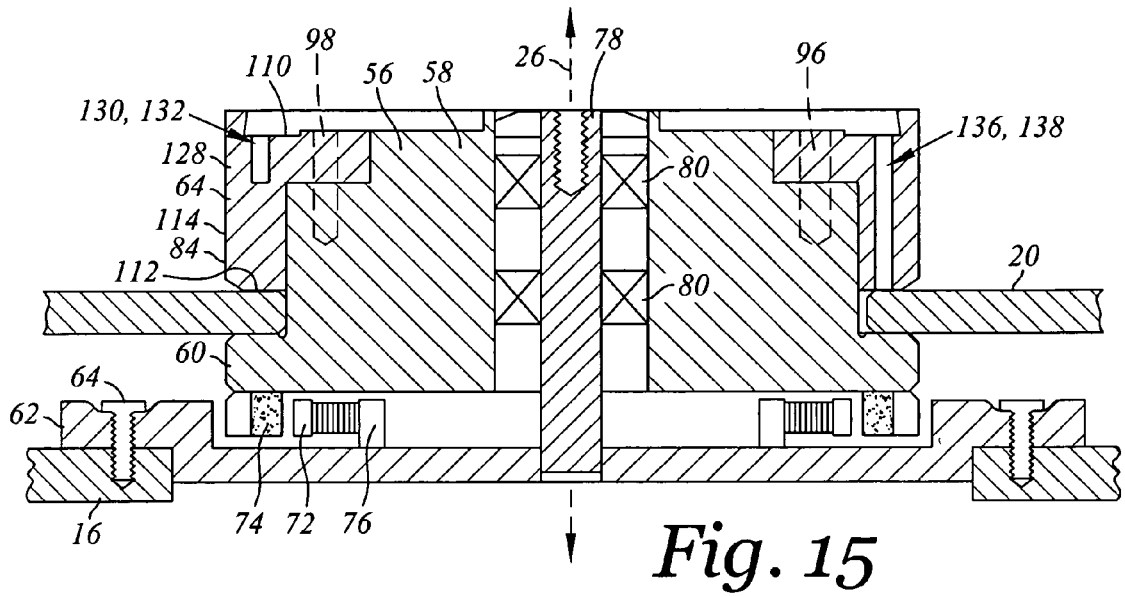
FIG. 15 is the cross sectional side view of the balancing element of FIG. 14 as shown with a spindle motor and a portion of a disk.
Figure 16:
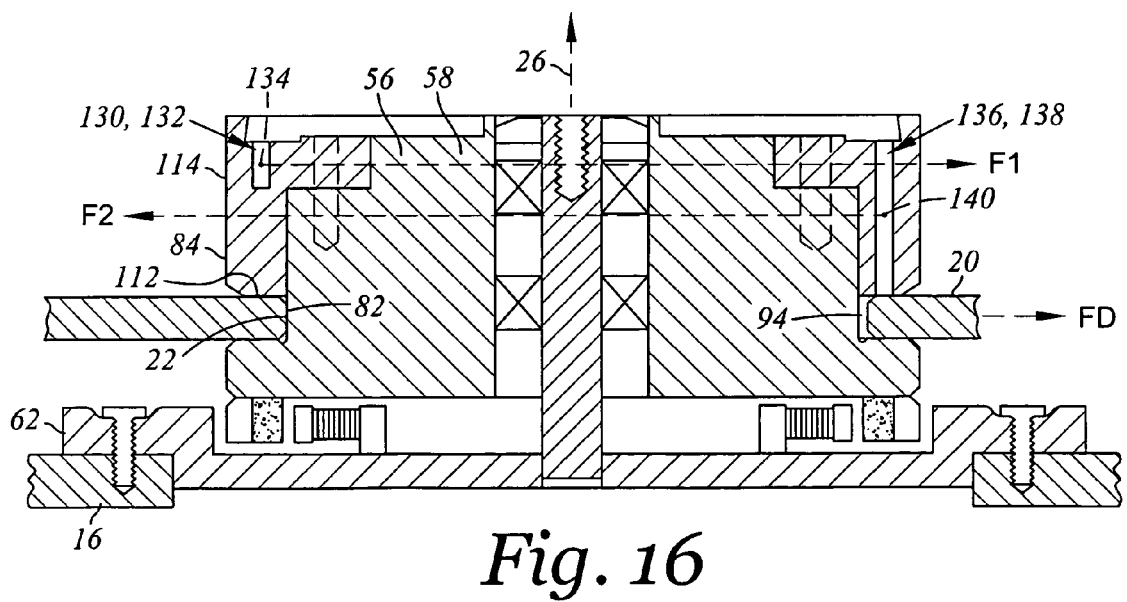
FIG. 16 is the cross sectional side view of the balancing element, the spindle motor and the portion of the disk of FIG. 15, however, as shown with the disk biased against the spindle motor and with symbolic force lines indicated.
Figure 17:
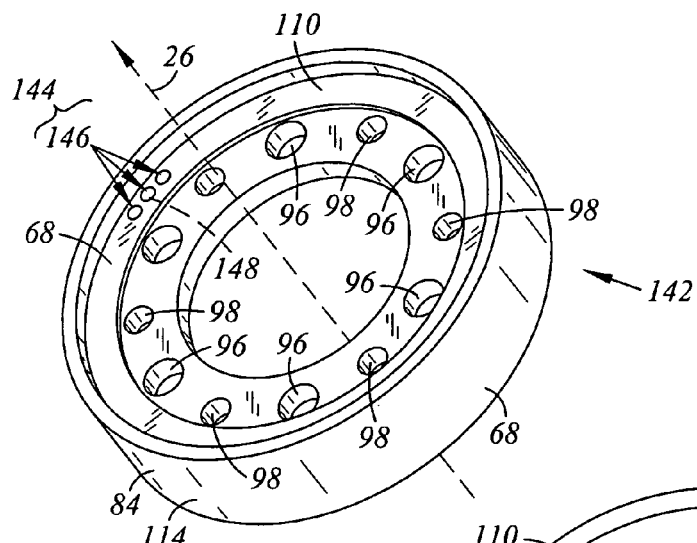
FIG. 17 is a perspective view similar to that of FIG. 2, however, of a balancing element according to another embodiment.
Figure 18:
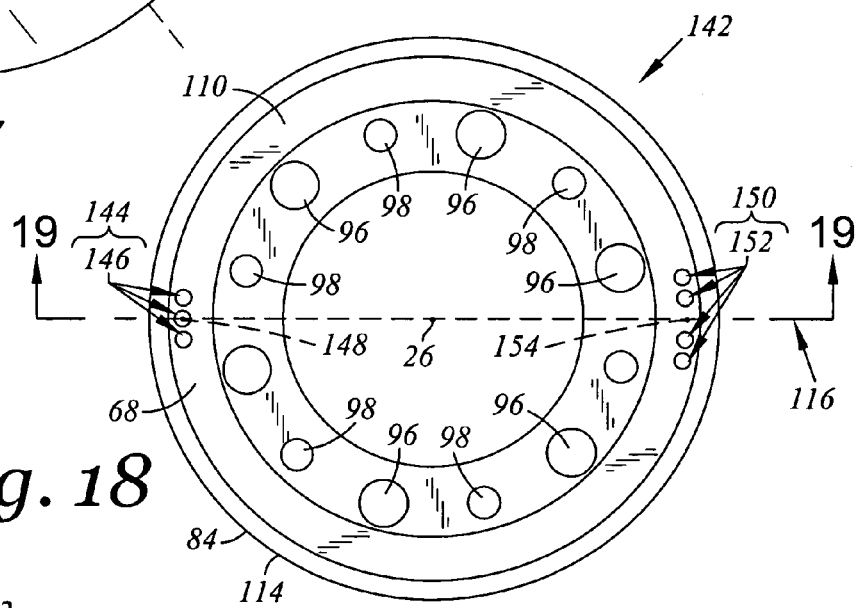
FIG. 18 is a top plan view of the balancing element of FIG. 17.
Figure 19:
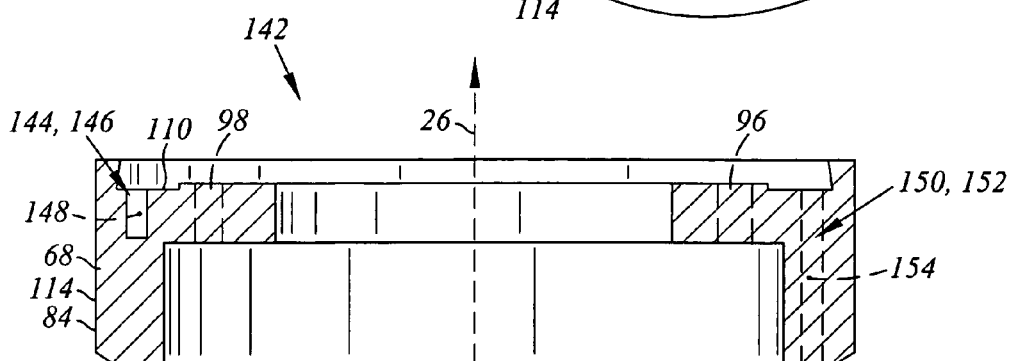
FIG. 19 is a cross sectional side view of the balancing element of FIG. 18 as seen along axis 19-19 (a second cavity indicated in dashed line)
Figure 20:
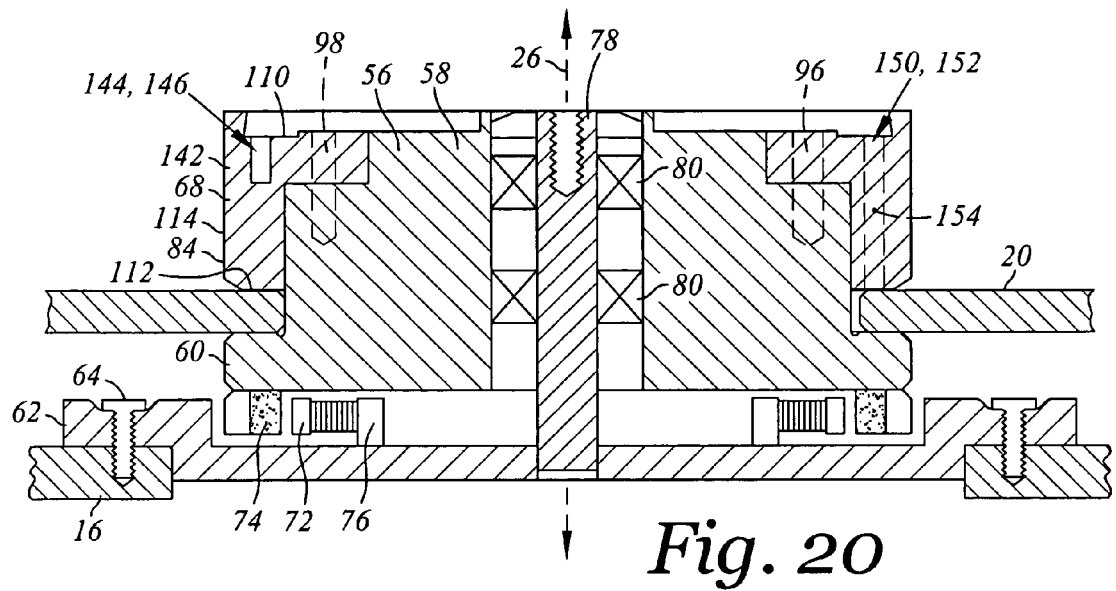
FIG. 20 is the cross sectional side view of the balancing element of FIG. 19 as shown with a spindle motor and a portion of a disk.
Figure 21:
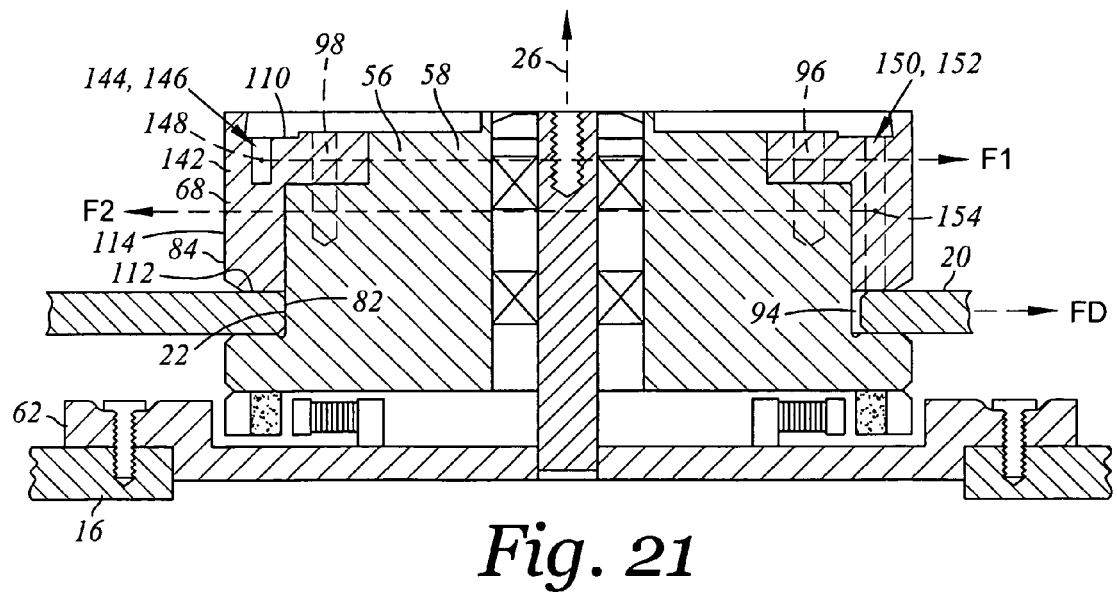
FIG. 21 is the cross sectional side view of the balancing element, the spindle motor and the portion of the disk of FIG. 20, however, as shown with the disk biased against the spindle motor and with symbolic force lines indicated.
Figure 22:
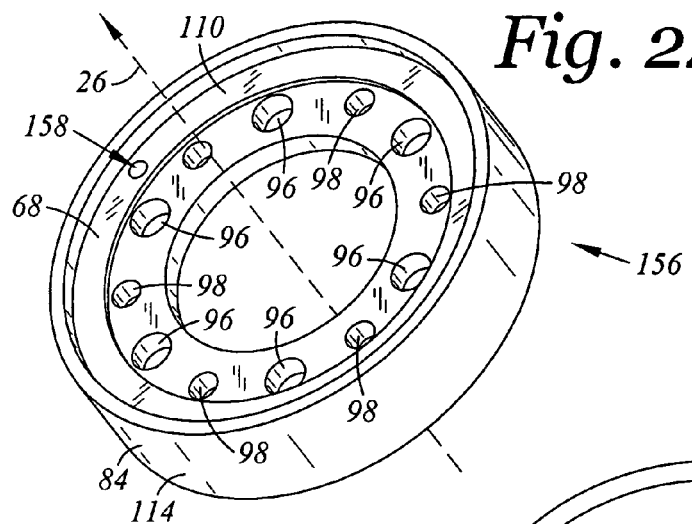
FIG. 22 is a perspective view similar to that of FIG. 2, however, of a balancing element according to another embodiment.
Figure 23:
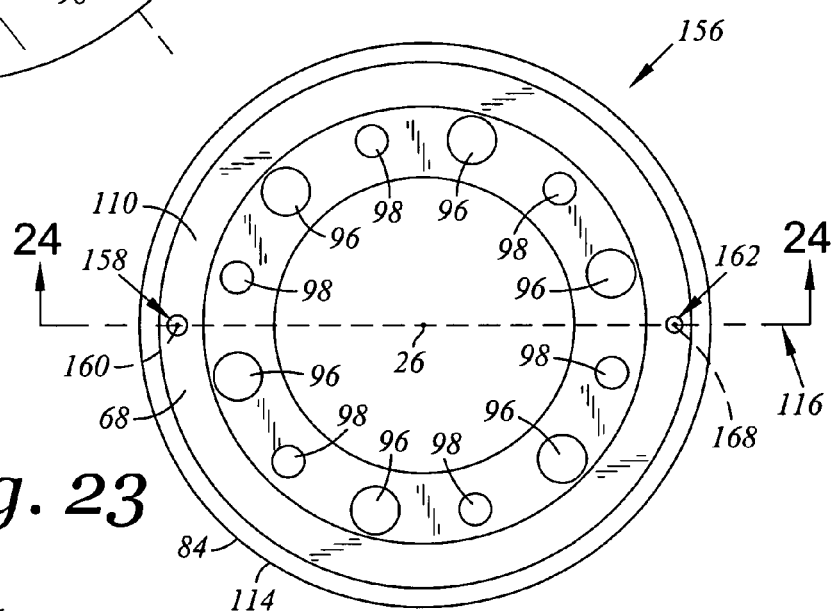
FIG. 23 is a top plan view of the balancing element of FIG. 22.
Figure 24:
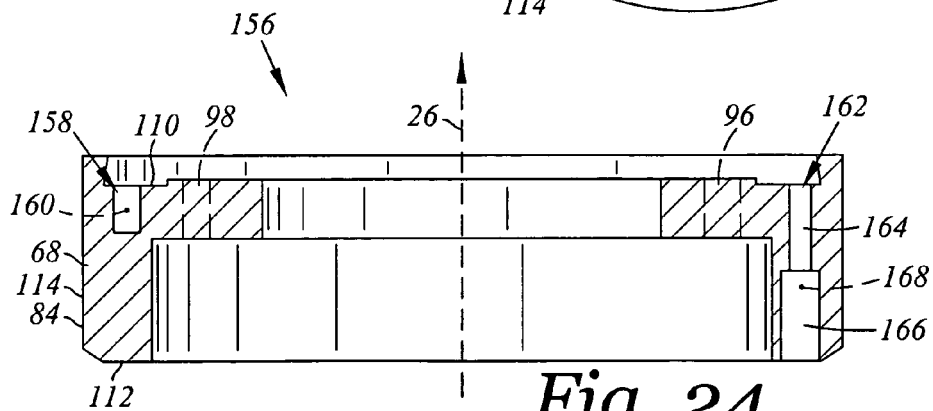
FIG. 24 is a cross sectional side view of the balancing element of FIG. 23 as seen along axis 24-24.
Figure 25:
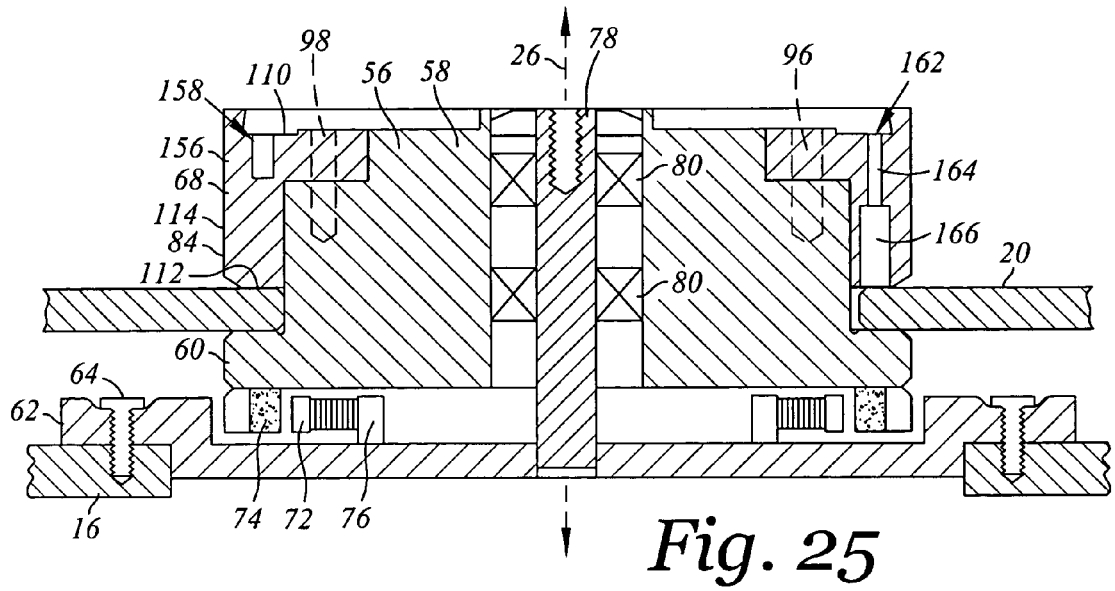
FIG. 25 is the cross sectional side view of the balancing element of FIG. 24 as shown with a spindle motor and a portion of a disk.
Figure 26:
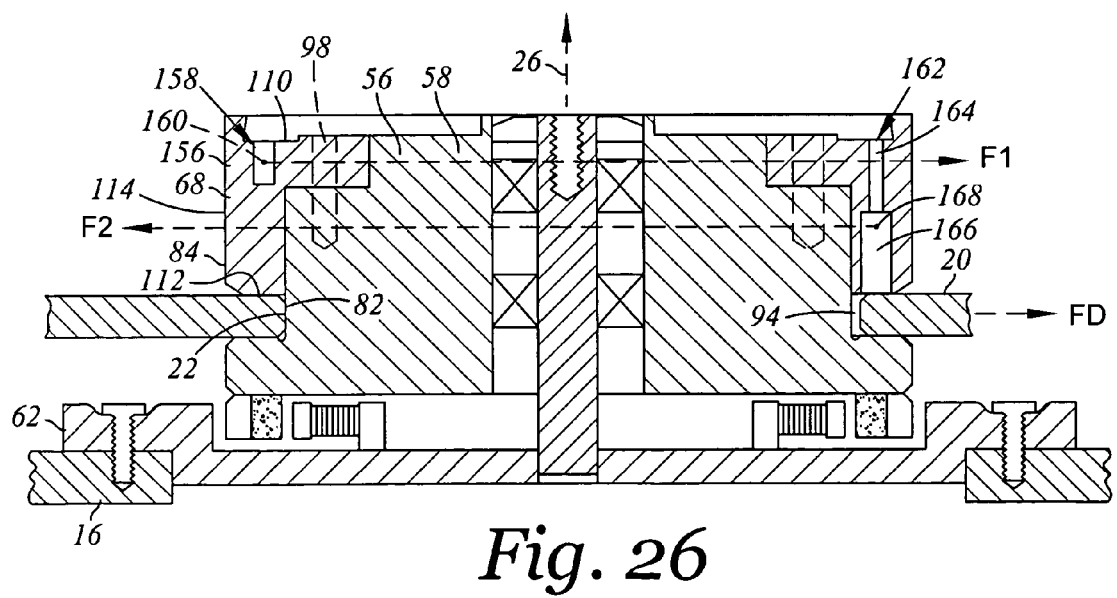
FIG. 26 is the cross sectional side view of the balancing element, the spindle motor and the portion of the disk of FIG. 25, however, as shown with the disk biased against the spindle motor and with symbolic force lines indicated.
Figure 30:
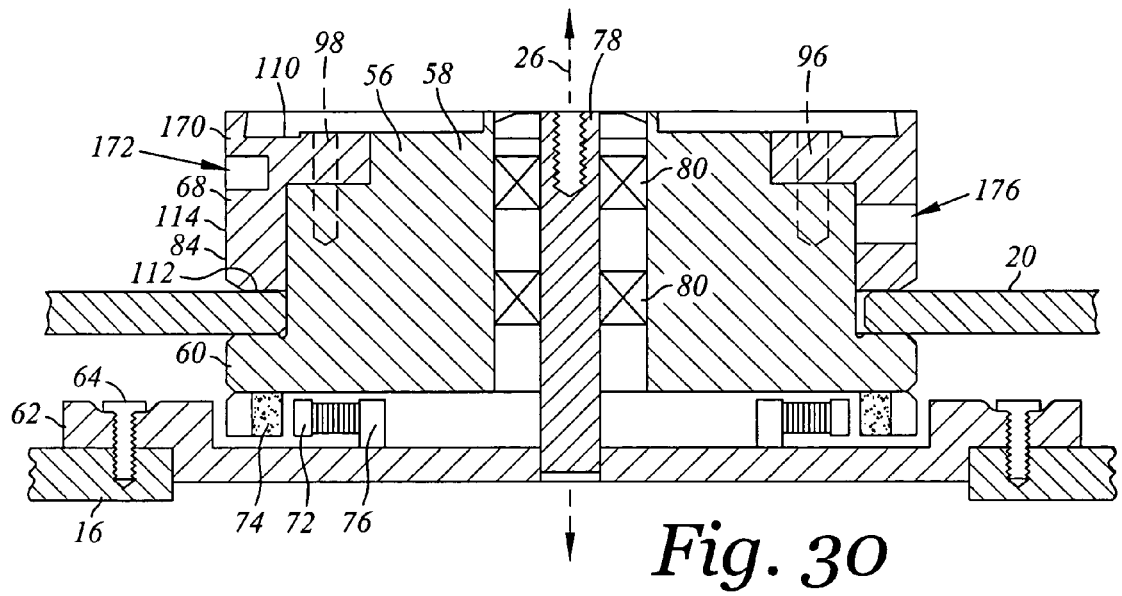
FIG. 30 is the cross sectional side view of the balancing element of FIG. 29 as shown with a spindle motor and a portion of a disk.
Figure 31:
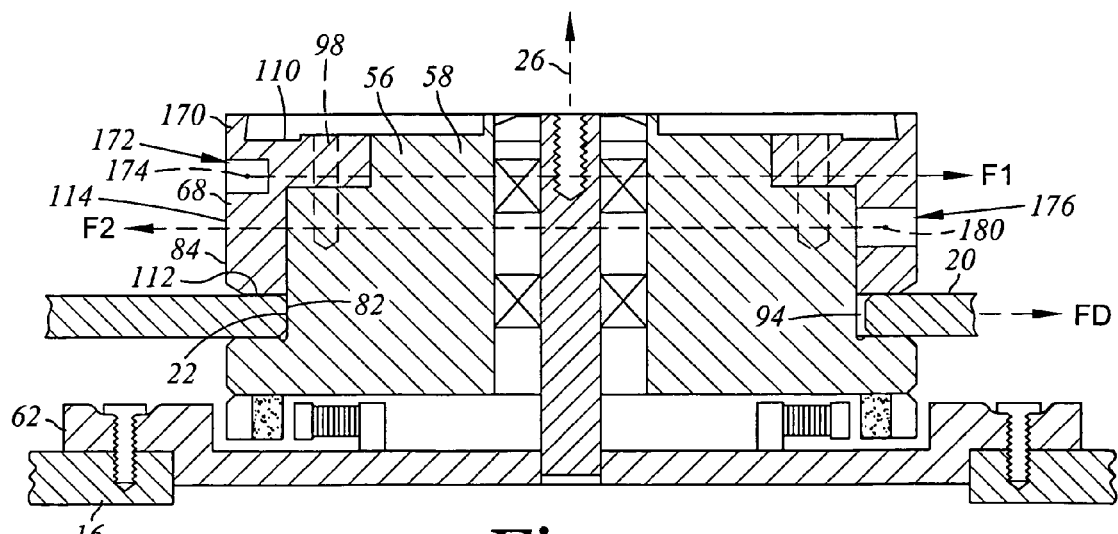
FIG. 31 is the cross sectional side view of the balancing element, the spindle motor and the portion of the disk of FIG. 30, however, as shown with the disk biased against the spindle motor and with symbolic force lines indicated.
Figure 35:
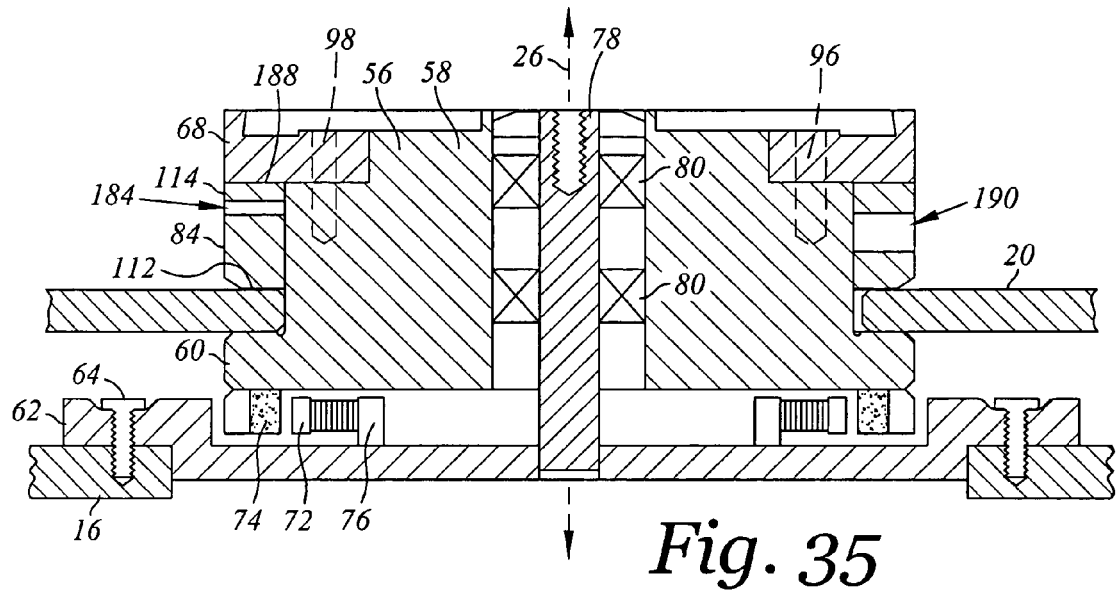
FIG. 35 is the cross sectional side view of the balancing element of FIG. 34 as shown with a spindle motor and a portion of a disk.
Figure 36:
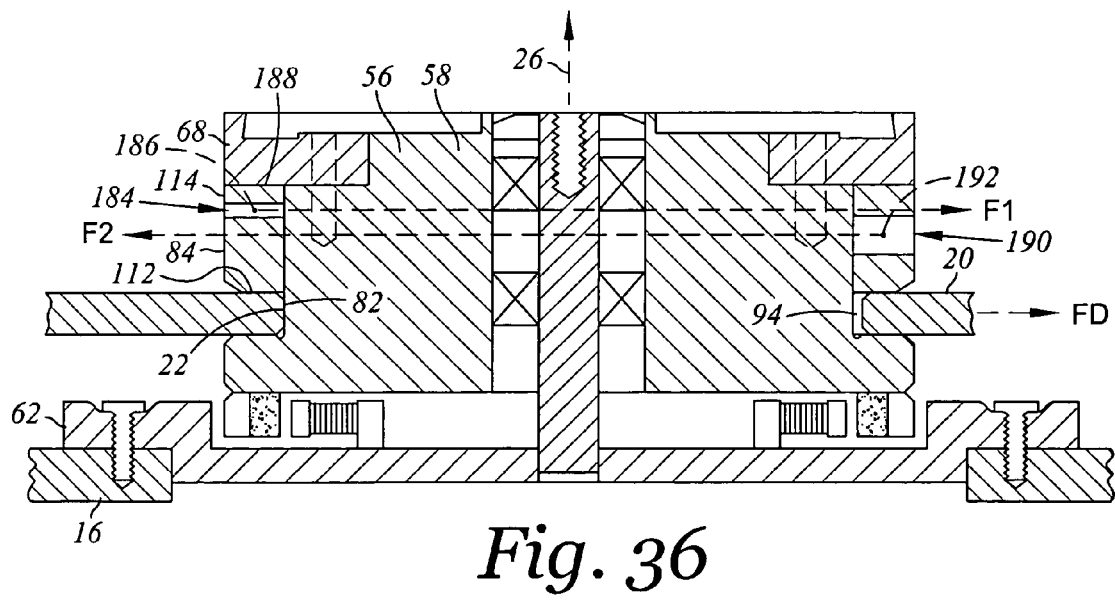
FIG. 36 is the cross sectional side view of the balancing element, the spindle motor and the portion of the disk of FIG. 35, however, as shown with the disk biased against the spindle motor and with symbolic force lines indicated.

As mentioned above, the disk inner diameter 22 is biased against the spindle motor hub 24 at a contact location 82 of the spindle motor hub 56. As illustrated in FIG. 6, the disk inner diameter 22 may be slightly larger than the outer diameter of the hub body 58. As such, the disk 20 is shifted with respect to the axis of rotation 26 (to the right as shown in FIG. 6) and a gap 94 is formed opposite the contact location 82. Upon rotation of the spindle motor hub 56, an imbalance of mass of the disk 20 with respect to the axis of rotation 26 results in a centrifugal force (symbolically indicated as FD in a direction to the right) that acts upon the spindle motor hub 56. Such centrifugal force FD acts in an outward radial direction extending away from the gap 94. The centrifugal force FD acts in a direction along an alignment plane 116 is defined by the contact location 82 and the axis of rotation 26 as seen in FIG. 3. In addition, such centrifugal force may result in a moment being applied to the spindle motor hub 56 about an axis extending through and orthogonal to the axis of rotation 26.

As defined herein, the first cavity 86 is a discontinuity or irregularity formed in the balancing element 66 that is circumferentially non-uniform with respect to the axis of rotation 26. Similarly, the second cavity 90 is a discontinuity or irregularity formed in the balancing element 66 that is circumferentially non-uniform with respect to the axis of rotation 26.

In this regard, the disk clamp 68 may include fastener openings 96 that are uniformly distributed about the axis of rotation 26 that are configured to receive the clamp fasteners 70. The fastener openings 96 are uniformly distributed about the axis of rotation 26 and do not result in a net centrifugal force being applied to the spindle motor hub 56 (other than that which is associated with manufacturing tolerances). As such, the fastener openings 96, individually or in any combination, are not considered to be either of the first or second cavities 86, 90 or any portion thereof. Further, the disk clamp 68 may include mass reduction holes 98 that are uniformly distributed about the axis of rotation 26. In the embodiment shown, the mass reduction holes 98 are alternately disposed between the fastener openings 96. The mass reduction holes 98 are uniformly distributed about the axis of rotation 26 and taken together do not result in a net centrifugal force being applied to the spindle motor hub 56 (other than that which is associated with manufacturing tolerances). As such, the fastener openings 96, individually or in any combination, are not considered to be either of the first or second cavities 86, 90 or any portion thereof.

The first cavity 86 defines the first cavity centroid 88 disposed on a same side of the axis of rotation 26 as the contact location 82. As such, as shown in FIG. 6, the first cavity 86 is disposed at a left side of the balancing element 66. Upon rotation of the spindle motor 24, the first cavity 86 has associated with it an imbalance of mass of the balancing element 66 with respect to the axis of rotation 26 that results in a centrifugal force (symbolically indicated as F1) that acts upon the spindle motor hub 56. Such centrifugal force F1 extends along a line through the first cavity centroid 88 and the axis of rotation 26 and orthogonal to the axis of rotation 26 in a direction opposite of the first cavity centroid 88 with respect to the axis of rotation 26.

The second cavity 90 defines the second cavity centroid 92 disposed on an opposite side of the axis of rotation 26 that the first cavity centroid 88. As such, as shown in FIG. 6, the second cavity 90 is disposed at a right-hand side of the balancing element 66. Upon rotation of the spindle motor 56, the second cavity 90 has associated with it an imbalance of mass of the balancing element 66 with respect to the axis of rotation 26 that results in a centrifugal force (symbolically indicated as F2) that acts upon the spindle motor hub 56. Such centrifugal force F2 extends along a line through the second cavity centroid 92 and the axis of rotation 26 and orthogonal to the axis of rotation 26 in a direction opposite of the second cavity centroid 92 with respect to the axis of rotation 26.

It is contemplated that the sizing and positioning of the first and second cavities 86, 90 may be configured to result in the centrifugal forces F1 and F2 that would cooperatively off-set or otherwise negate imbalancing effects of the centrifugal force FD associated with the biasing of the disk 20. In this regard, balancing element 66 may facilitate balancing in a direction orthogonal to the axis of rotation 26 and in a plane that includes the axis of rotation 26 and the contact location 82 (i.e., in a left and right direction in FIG. 6). This type of balancing is sometimes referred to as single plane or static balancing.

Additionally, the balancing element 66 facilitates balancing with regard to a moment associated with the centrifugal force FD about an axis extending from the axis of rotation 26 in a plane orthogonal to the axis of rotation 26 through the axis of rotation 26 (i.e., into and out of the page in FIG. 6). This is sometimes referred to as a two plane or dynamic balancing. Such balancing is feasible because the second cavity centroid 92 is spaced apart from the first cavity centroid 88 in a direction along the axis of rotation 26 with the first cavity 86 on the same side as the contact location 82 and the second cavity opposite such location. The centrifugal forces F1 and F2 also have associated with them moments that may cooperatively off-set or otherwise negate imbalancing effects of the centrifugal force FD associated with the biasing of the disk 20. As such, utilization of the balancing element 66 installed upon spindle motor hub 56 facilitates a comprehensive disk pack balancing approach.

The balancing element 66 may be formed of any number of materials which may be chosen from those which are well known to one of ordinary skill in the art such as a metal such as aluminum. Further, the balancing element 66 may be formed according to techniques which may be chosen from those which are well known to one of ordinary skill in the art, such as machining.

In addition, in certain embodiments of the present invention the first and second cavities 86, 90 are occupied by a matter having a density different than the balancing element 66. As shown, the first and second cavities 86, 90 are occupied by air (a matter having a density significantly less than the balancing element 66 which is formed of a solid material). In another arrangement, though not shown, the first and second cavities 86, 90 may be occupied by a solid material and such solid material may have a density greater than or less than the balancing element 66 (such as plastic or a different type of metal than may be used to form the balancing element 66). In this regard, additional mass may be added within the first and/or second cavities 86, 90 in the form of a plug or pin that may be press-fit within the first and/or second cavities 86, 90 for example. Moreover, the first and second cavities 86, 90 may be filled with different materials (such as air and metal). In this regard, the formation of the first and second cavities 86, 90 such that the first cavity centroid 88 and the second cavity centroid 92 are vertically spaced apart may be considered to be an initial moment balancing. Such initial moment balancing could then be fine tuned through the use of additional masses added within the first cavity 86 and/or the second cavity 90.

In the particular embodiment shown, though not required, the second cavity centroid 92 is positioned between the first cavity centroid 88 and the disk 20 in a direction parallel to the axis of rotation 26. In this regard, the second cavity centroid 92 is closer to the contact location 82 along the axis of rotation 26 than the first cavity centroid 88.

The balancing element 66 includes an upper surface 110 disposed away from the disk 20 and a lower surface 112 disposed towards the disk 20. The upper and lower surfaces 110, 112 are relative terms in comparison to each other. As such, the upper and lower surfaces 110, 112 refer to opposite portions of the balancing element 66 with the upper surface 110 being generally disposed closer to the cover 18 than the disk drive base 16, and the lower surface 112 disposed towards the disk drive base 16. The balancing element 66 further includes an outer periphery 114 with respect to the axis of rotation 26. The outer periphery 114 is a general term that refers to that portion of the balancing element 66 that is disposed radially further from other portions of the balancing element 66 with regard to the axis of rotation 26. In the embodiment shown, though not required, the outer periphery 114 intersects the upper surface 110 and also intersects the lower surface 112.

In this embodiment, the first cavity 86 is disposed along the outer periphery 114 at the upper surface 110. The first cavity 86 is open at both the outer periphery 114 and the upper surface 110. The first cavity 86 is closed with respect to the lower surface 112. The first cavity 86 is formed in the cylindrical portion 84. The second cavity 90 is disposed along the outer periphery 114 and is open at the outer periphery 114. The second cavity is closed with regard to the upper and lower surfaces 110, 112. The second cavity 90 takes the form of a horizontal notch formed in the cylindrical portion 84.

As mentioned above, the axis of rotation 26 and the contact location 82 define the alignment plane 116. In the embodiment shown, the disk 20 is biased against the spindle motor hub 56 such that the first cavity centroid 88 and the second cavity centroid 92 each are disposed within 20 degrees of the alignment plane 116 about the axis of rotation 26.

According to another embodiment, referring now to FIGS. 7-11, there is depicted a balancing element 118. The views of FIGS. 7-11 are respectively similar to those of FIGS. 2-6, however according to another embodiment. It is noted that like reference numerals are intended to designate like elements as discussed above, however, with differences as discussed and as shown. In this embodiment, the balancing element 118 includes a first cavity 120 having a first cavity centroid 122 and a second cavity 124 having a second cavity centroid 126. Both of the first and second cavities 120, 124 are contiguous cavities. The first cavity centroid 122 is disposed in the first cavity 120 and the second cavity centroid 126 is disposed in the second cavity 124. The first cavity 120 is a hole that extends through the upper surface 110 into the balancing element 118. The first cavity 120 is open with regard to the upper surface 110 and closed with regard to both the outer periphery 114 and the lower surface 112. The first cavity 120 defines a uniform diameter. The second cavity 124 is a hole that extends through the balancing element 118 between the upper surface 110 and the lower surface 112. The second cavity 124 defines a uniform diameter between the upper surface 110 and the lower surface 112. The second cavity 124 is open with regard to both the upper and lower surfaces 110, 112 and closed with regard to the outer periphery 114.

According to another embodiment, referring now to FIGS. 12-16, there is depicted a balancing element 128. The views of FIGS. 12-16 are respectively similar to those of FIGS. 7-11, however according to another embodiment. It is noted that like reference numerals are intended to designate like elements as discussed above, however, with differences as discussed and as shown. In this embodiment, the balancing element 128 includes a first cavity 130 that is a split cavity that includes a plurality of first cavity voids 132. The first cavity 130 includes a first cavity centroid 134 that is within a respective one of the voids 132. The first cavity voids 132 are symmetrically angularly spaced about the axis of rotation 26 from the alignment plane 116. The balancing element 128 further includes a second cavity 136 that is a split cavity that includes a plurality of second cavity voids 138. The second cavity 136 includes a second cavity centroid 140 that is within a respective one of the voids 138. The second cavity voids 138 are symmetrically angularly spaced about the axis of rotation 26 from the alignment plane 116.

According to another embodiment, referring now to FIGS. 17-21, there is depicted a balancing element 142. The views of FIGS. 17-21 are respectively similar to those of FIGS. 12-16, however according to another embodiment. It is noted that like reference numerals are intended to designate like elements as discussed above, however, with differences as discussed and as shown. In this embodiment, the balancing element 142 includes a first cavity 144 that is a split cavity that includes a plurality of first cavity voids 146. The first cavity 144 includes a first cavity centroid 148. The first cavity centroid 148, considering all of the first cavity voids 146 together, is located outside of any one of the voids 146. The balancing element 142 includes a second cavity 150 that is a split cavity that includes a plurality of second cavity voids 152. The second cavity 150 includes a second cavity centroid 154. The second cavity centroid 154, considering all of the second cavity voids 152 together, is located outside of any one of the voids 152.

According to another embodiment, referring now to FIGS. 22-26, there is depicted a balancing element 156. The views of FIGS. 22-26 are respectively similar to those of FIGS. 7-11, however according to another embodiment. It is noted that like reference numerals are intended to designate like elements as discussed above, however, with differences as discussed and as shown. In this embodiment, the balancing element 156 includes a first cavity 158 having a first cavity centroid 160. The balancing element 156 further includes a second cavity 162. The second cavity 162 is a hole that extends through the balancing element 156 between the upper surface 110 and the lower surface 112. The second cavity 162 defines a non-uniform diameter between the upper surface 110 and the lower surface 112. The second cavity 162 includes an upper chamber 164 and a lower chamber 166. In the embodiment shown, the lower chamber 166 has a greater diameter than the upper chamber 164, and the second cavity 162 includes a second cavity centroid 168 that is disposed in the lower chamber 166.

According to another embodiment, referring now to FIGS. 27-31, there is depicted a balancing element 170. The views of FIGS. 27-31 are respectively similar to those of FIGS. 2-6, however according to another embodiment. It is noted that like reference numerals are intended to designate like elements as discussed above, however, with differences as discussed and as shown. In this embodiment, the balancing element 170 includes a first cavity 172 having a first cavity centroid 174. The balancing element 170 further includes an inner periphery 178. The balancing element 170 further includes a second cavity 176 that extends between the inner and outer peripheries 178, 114. The second cavity 176 has a second cavity centroid 180. Both of the first and second cavities 172, 176 are contiguous cavities. The first cavity 172 is a hole that extends through the outer periphery 114 into the balancing element 170. The first cavity 172 is open with regard to the outer periphery 114 and closed with regard to the inner periphery 178, the upper surface 110 and the lower surface 112. The first cavity 120 defines a uniform diameter. The second cavity 176 is a hole that extends through the balancing element 170 and defines a uniform diameter. The second cavity 124 is open with regard to both the inner and outer peripheries 178, 114 and closed with regard to both the upper and lower surfaces 110, 112.

According to another embodiment, referring now to FIGS. 32-36, there is depicted a balancing element 182. The views of FIGS. 32-36 are respectively similar to those of FIGS. 2-6, however according to another embodiment. It is noted that like reference numerals are intended to designate like elements as discussed above, however, with differences as discussed and as shown. In this embodiment, the balancing element 182 includes a first cavity 184 having a first cavity centroid 186 and a second cavity 190 having a second cavity centroid 192. In this embodiment, the cylindrical portion 84 comprises an entirety of the balancing element 182. In this regard, the balancing element 182 may be a spacer ring. As shown, the balancing element 182 in the form of the spacer ring is disposed adjacent a disk clamp and the disk 20 is the only disk of the disk drive 10. In FIG. 32, there is depicted the disk clamp 68 exploded from the balancing element 182. Though not shown, where multiple disks are provided, the balancing element may be positioned between the disks. The first cavity 184 extends between the inner and outer peripheries 178, 114. The balancing element 182 includes an upper surface 188. The first cavity 184 is open with regard to the inner and outer peripheries 178, 114 and closed with regard to the upper and lower surfaces 188, 112. The second cavity 190 extends between the inner and outer peripheries 178, 114. The second cavity 190 is open with regard to the inner and outer peripheries 178, 114 and closed with regard to the upper and lower surfaces 188, 112. The first cavity 184 defines a diameter less than that of the second cavity 190.

While the balancing element 182 in the form of a spacer ring is shown with a specific type of cavity shaping for the first and second cavities 184, 190, any of those cavity configurations such as described above in the various other embodiments of the disk clamp configuration may be implemented in a spacer ring configuration. Moreover, any of those first cavity configurations described herein in the context of the disk clamp may be used with a second cavity configuration as described herein in the context of a spacer ring.

Figure 37:
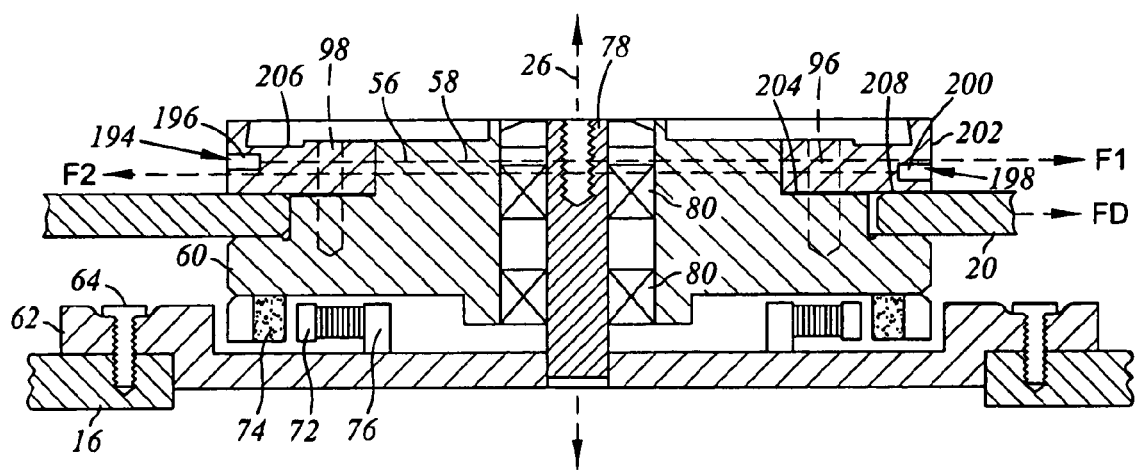
FIG. 37 is a cross sectional side view of a balancing element of another embodiment as shown with a spindle motor and a portion of a disk.

According to another embodiment, referring now to FIG. 37, there is depicted a balancing element 192. The view of FIG. 37 is respectively similar to that of FIG. 6, however according to another embodiment. It is noted that like reference numerals are intended to designate like elements as discussed above, however, with differences as discussed and as shown. In this embodiment, the balancing element 192 includes a first cavity 194 having a first cavity centroid 196 and a second cavity 198 having a second cavity centroid 200. The balancing element 192 includes a cylindrical portion 202. The spindle motor hub 56 includes an intermediate surface 204. The cylindrical portion 202 includes an upper surface 206 and a lower surface 208 that engages the disk 20. In this view the intermediate surface 204 is set lower than the disk 20 so as to facility such secure engagement of the disk 20 and the lower surface 208.

We claim:
1. A disk drive comprising:
a disk drive base;
a spindle motor rotatably coupled to the disk drive base, the spindle motor including a spindle motor hub defining an axis of rotation;
a disk disposed about the spindle motor hub, the disk including a disk inner diameter biased against the spindle motor hub at a contact location of the spindle motor hub; and
a balancing element including:
a cylindrical portion disposed about the spindle motor hub;
a first cavity defining a first cavity centroid, the first cavity centroid disposed on a same side of the axis of rotation as the contact location; and
a second cavity defining a second cavity centroid, the second cavity centroid disposed on a side of the axis of rotation opposite the first cavity centroid, the second cavity centroid being spaced apart from the first cavity centroid in a direction along the axis of rotation.

2. The disk drive of claim 1 wherein the axis of rotation and the contact location defined an alignment plane, the first cavity centroid and the second cavity centroid each are disposed within 20 degrees of the alignment plane about the axis of rotation.

3. The disk drive of claim 1 wherein the second cavity centroid is closer to the contact location along the axis of rotation than the first cavity centroid.

4. The disk drive of claim 1 wherein the balancing element includes an upper surface disposed away from the disk, the balancing element further includes an outer periphery with respect to the axis of rotation, and the first cavity is disposed along the outer periphery at the upper surface.

5. The disk drive of claim 4 wherein the first cavity is open at the upper surface and the outer periphery.

6. The disk drive of claim 4 wherein the second cavity is open at the outer periphery.

7. The disk drive of claim 1 wherein the balancing element includes a lower surface disposed towards the disk, the second cavity is open at the lower surface.

8. The disk drive of claim 7 wherein the second cavity is closed at the outer periphery.

9. The disk drive of claim 7 wherein the balancing element includes an upper surface disposed away from the disk, the second cavity is a hole extending through the balancing element between the upper surface and the lower surface.

10. The disk drive of claim 7 wherein the second cavity defines a uniform diameter between the upper surface and the lower surface.

11. The disk drive of claim 7 wherein the second cavity defines a non-uniform diameter between the upper surface and the lower surface.

12. The disk drive of claim 1 wherein the second cavity is a contiguous cavity with the second cavity centroid within the second cavity.

13. The disk drive of claim 1 wherein the second cavity is a split cavity that includes a plurality of voids.

14. The disk drive of claim 13 wherein the plurality of voids are symmetrically angularly spaced about the axis of rotation from the alignment plane.

15. The disk drive of claim 13 wherein the second cavity centroid, considering all voids together, is located outside of any one of the voids.

16. The disk drive of claim 1 wherein the balancing element is a disk clamp.

17. The disk drive of claim 1 wherein the cylindrical portion comprises an entirety of the balancing element.

18. The disk drive of claim 17 wherein the balancing element is a spacer ring.

19. The disk drive of claim 18 further comprises a disk clamp, wherein the spacer ring is disposed adjacent a disk clamp and the disk is the only disk of the disk drive.

* * * * *